United States Patent
Brestal et al.

(10) Patent No.: US 7,975,423 B2
(45) Date of Patent: Jul. 12, 2011

(54) DECOY

(75) Inventors: Willard Brestal, Naperville, IL (US); Harold Brestal, Naperville, IL (US); Matthew Paul Hoppe, Little Chute, WI (US)

(73) Assignee: Everwind Decoys, Inc., Waterman, IL (US)

( * ) Notice: Subject to any disclaimer, the term of this patent is extended or adjusted under 35 U.S.C. 154(b) by 0 days.

(21) Appl. No.: 12/544,054

(22) Filed: Aug. 19, 2009

(65) Prior Publication Data
US 2010/0071248 A1 Mar. 25, 2010

Related U.S. Application Data

(60) Provisional application No. 61/098,996, filed on Sep. 22, 2008.

(51) Int. Cl.
*A01M 31/06* (2006.01)
(52) U.S. Cl. .................................... 43/3; 43/2
(58) Field of Classification Search ....................... 43/2, 3
See application file for complete search history.

(56) References Cited

U.S. PATENT DOCUMENTS

| | | | | |
|---|---|---|---|---|
| 512,810 A | * | 1/1894 | Curlin | 43/3 |
| 1,409,285 A | * | 3/1922 | Dennett | 43/3 |
| 1,673,479 A | * | 6/1928 | Allen | 446/156 |
| 1,940,490 A | * | 12/1933 | Frazier | 40/413 |
| 4,062,141 A | * | 12/1977 | Shjeflo | 43/3 |
| 4,322,908 A | * | 4/1982 | McCrory | 43/3 |
| 4,611,421 A | * | 9/1986 | Jacob | 43/3 |
| 4,656,770 A | * | 4/1987 | Nuttle | 43/2 |
| 4,753,028 A | * | 6/1988 | Farmer | 43/3 |
| 5,144,764 A | * | 9/1992 | Peterson | 43/3 |
| 5,172,506 A | * | 12/1992 | Tiley et al. | 43/3 |
| 5,467,543 A | * | 11/1995 | Fink et al. | 40/538 |
| 6,050,017 A | * | 4/2000 | Barry | 43/2 |
| 6,360,474 B1 | * | 3/2002 | Wurlitzer | 43/3 |
| 6,484,431 B2 | * | 11/2002 | Price et al. | 43/3 |
| 6,764,201 B2 | * | 7/2004 | Chi-Cheng | 362/352 |
| 7,481,017 B1 | * | 1/2009 | Bocchi | 43/3 |
| 2002/0178638 A1 | * | 12/2002 | Fulcher | 43/2 |
| 2003/0056418 A1 | * | 3/2003 | Mason et al. | 43/2 |
| 2003/0177677 A1 | * | 9/2003 | Acosta, Sr. | 40/410 |
| 2005/0144828 A1 | * | 7/2005 | Lewis et al. | 43/3 |
| 2006/0016115 A1 | * | 1/2006 | Ware et al. | 43/3 |

OTHER PUBLICATIONS www.deadlydecoys.com, Date Unknown.

* cited by examiner

*Primary Examiner* — David J Parsley
(74) *Attorney, Agent, or Firm* — McAndrews, Held & Malloy, Ltd.

(57) ABSTRACT

Decoys that resemble animals, such as birds, for example, and methods of making such decoys are provided. In an embodiment, a decoy can include a rigid member, a non-rigid body comprising an inner portion and an exterior portion, and a fan configured to direct air toward the inner portion of the non-rigid body, wherein the non-rigid body and the fan are attached to the rigid member. In an embodiment, a decoy can also include a head and neck portion. In an embodiment, a solar panel and/or a battery can provide power for the fan. In an embodiment, the fan can be manipulated between, on, off, and modulate settings using a manually operated switch and/or a remote control. In an embodiment, the fan can be configured to rotate and/or move side-to-side while directing air toward the inner portion of the non-rigid body.

20 Claims, 3 Drawing Sheets

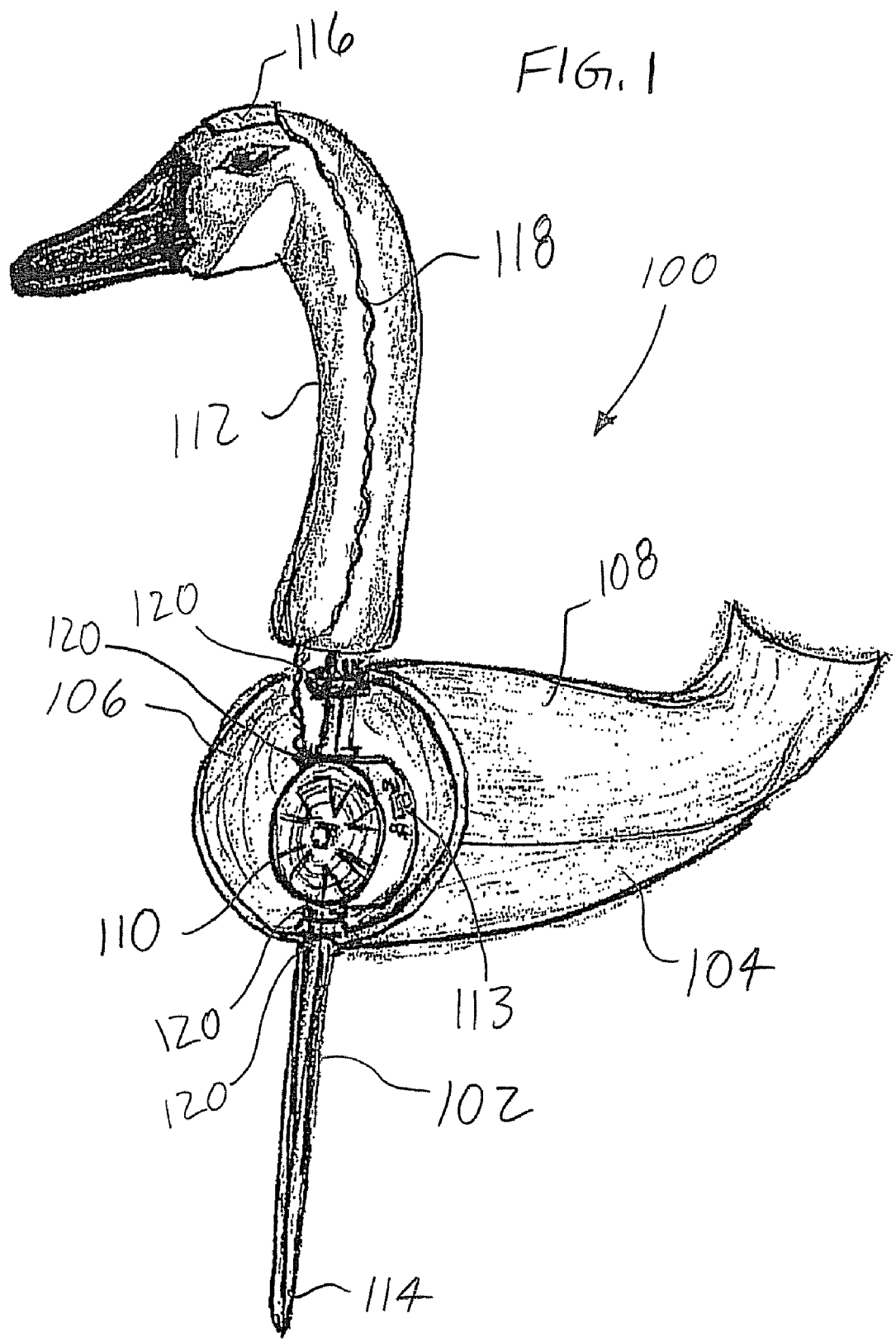

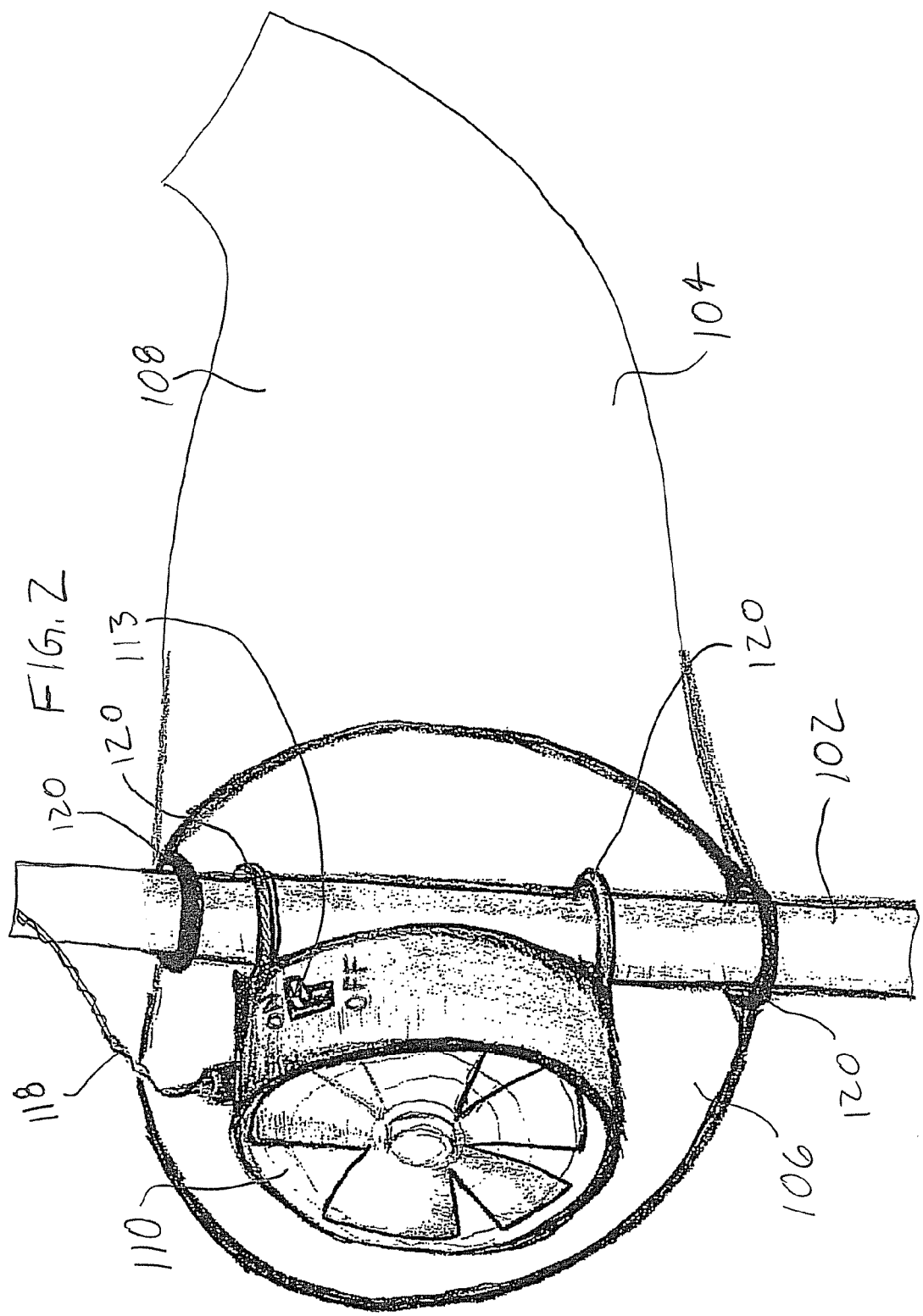

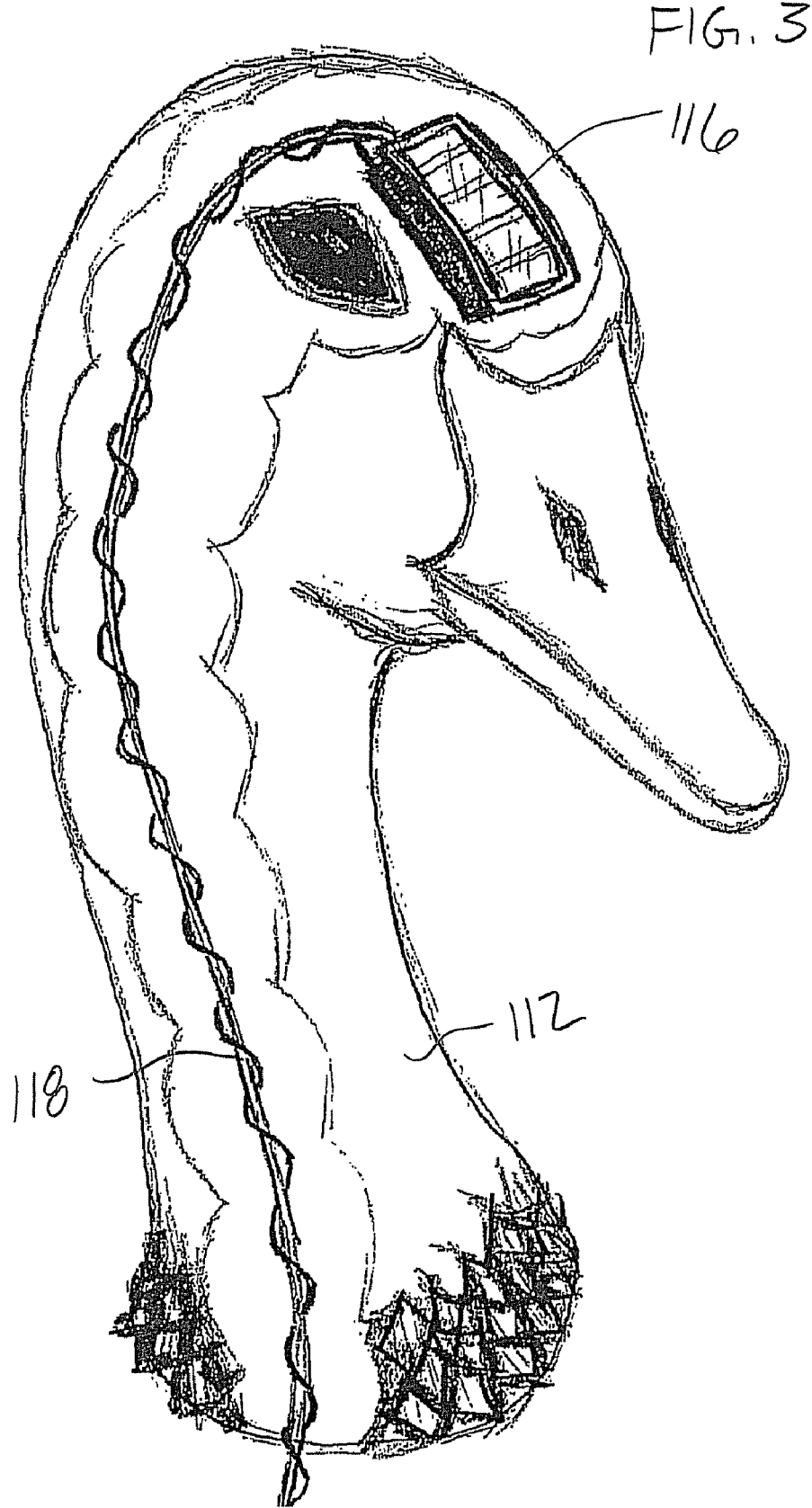

DECOY

CROSS-REFERENCE TO RELATED APPLICATIONS/INCORPORATION BY REFERENCE

This application claims priority to U.S. Provisional Application No. 61/098,996 filed Sep. 22, 2008, entitled "IMPROVED DECOY" which application is incorporated by reference herein in its entirety.

UNITED STATES PATENT FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Decoys that resemble birds are used in hunting. Currently available decoys have body portions that function like windsocks, fluttering in the wind, and thereby providing the appearance of movement and variation. However, on days when the wind is light or nonexistent, such decoys do not provide the desired appearance. Improved decoys, and methods of making decoys, that do not exhibit such shortcomings are desirable.

SUMMARY OF THE INVENTION

Certain embodiments of the present technology provide decoys that resemble animals, such as birds, for example, and include a fan configured to direct air through a non-rigid body. In certain embodiments, for example, the fan can be powered by solar energy and/or a battery.

BRIEF DESCRIPTION OF THE DRAWINGS(S)

FIG. 1 is a perspective view of a decoy used in accordance with an embodiment of the present technology.

FIG. 2 is a perspective view of a portion of a decoy used in accordance with an embodiment of the present technology.

FIG. 3 is a perspective view of a portion of a decoy used in accordance with an embodiment of the present technology.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Below is a detailed description of embodiments depicted in FIGS. 1-3. In the figures, like elements are identified with like numbers.

FIG. 1 is a perspective view of a decoy 100 used in accordance with an embodiment of the present technology. FIGS. 2 and 3 are perspective views of certain portions of a decoy used in accordance with an embodiment of the present technology. In the embodiments shown, for example, the decoy is configured to resemble a bird. In certain embodiments, for example, decoys used in accordance with embodiments of the present technology can resemble a snow goose, a blue goose, or any other type of bird. In certain embodiments, decoys can be provided as described herein that resemble other animals, such as deer or coyotes or any other animal that can be hunted, for example.

In the embodiment shown in FIG. 1, for example, the decoy 100 includes a rigid member 102, a non-rigid body 104 including an inner portion 106 and an exterior portion 108, a fan 110 and a head and neck portion 112. Certain embodiments do not include the head and neck portion 112. The non-rigid body 104, the fan 110 and the head and neck portion 112 are attached to the rigid member 102. In certain embodiments, for example, the non-rigid body portion 104, the fan 110 and the head and neck portion 112 can be removably attached to the rigid member 102.

In the embodiment shown in FIG. 1, for example, the head and neck member 112 is attached to a first end of the rigid member 102. In certain embodiments, for example, an opening in the head and neck member 112 can be configured to receive the first end of the rigid member 102. For example, the head and neck member 112 can be configured to slide onto the first end of the rigid member 102. The members 112, 102 can be held together in a tension fit and/or using a locking mechanism. Disposed beneath the head and neck portion 112, are the non-rigid body 104 and the fan 110. In the embodiment shown, the non-rigid body 104 and the fan 110 include clamping devices 120 configured to receive the rigid member 102. In certain embodiments, for example, the clamping devices 120 can be slid over the rigid member 102 and locked into place at a desired position. The rigid member 102 also includes a second end 114 configured to secure the rigid member 102 in a stationary position. In certain embodiments, for example, the second end 114 can be pointed or otherwise configured such that the second end 114 can secure the rigid member 102 in the ground. In certain embodiments, for example, the rigid member 102 can deflect to certain degree. That is, the rigid member 102 need not be completely rigid, but rigid enough to maintain the decoy 100 in a substantially upright position when the rigid member 102 is secured in a stationary position.

In the embodiment shown in FIG. 1, for example, the fan 110 is configured to direct air toward the inner portion 106 of the non-rigid body 104. The air can flow through the inner portion 106 of the non-rigid body 104, thereby providing movement of the non-rigid body 104. In certain embodiments, for example, the non-rigid body 104 can be made of cloth or fabric similar to those employed in a windsock, for example. In certain embodiments, for example, the inner portion 106 of the non-rigid body 104 can comprise an inflatable bladder. Such embodiments can provide improved movement of the decoy that more closely resembles movement of a living animal.

In certain embodiments, for example, the fan 110 can be similar to the fans used in computers. In certain embodiments, the fan can be configured to rotate while directing air toward the inner portion 106 of the non-rigid body 104. Rotation settings such as constant motion, wherein the fan constantly rotates, and delayed motion, wherein the fan position remains constant at certain positions, can be included. In certain embodiments, the fan can be configured to modulate between on and off settings, for example, spending a desired period of time on and a desired period of time off. For example, in certain embodiments, the fan may be configured to spend 3 to 4 seconds on and then 3 to 4 seconds off, and so on. In certain embodiments, the fan can be configured for lateral displacement, thereby moving from side-to-side while directing air toward the inner portion 106 of the non-rigid body 104. Lateral movement settings such as constant motion, wherein the fan constantly moves from side-to-side, and delayed motion, wherein the fan position remains constant at certain positions, can be included.

In certain embodiments, for example, the decoy 104 can include framing that provides the general shape of a bird's body or another animal's body. In such embodiments, the non-rigid body 104 can be secured to the framing such that airflow through the inner portion 106 of the non-rigid body 104 can still provide for movement of the non-rigid body 104.

In the embodiment shown in FIG. 1, for example, the fan 110 includes a switch 113 configured to be manually manipulated between an on position, wherein the fan is turned on, and an off position, wherein the fan is turned off. In the embodiment shown, the switch 113 is located on the fan. In other embodiments, a switch for the fan can be located in other positions, such as on the head and neck portion 112, for example.

In certain embodiments, for example, the fan 110 can be configured to be manipulated between an on setting, wherein the fan is turned on, and an off setting, wherein the fan is turned off, using a radio frequency transmitter and receiver. In such embodiments, the radio frequency receiver can be in electrical communication with the fan 110 and the radio frequency transmitter can be disposed with a remote control. Radio frequency signals can be transmitted from the transmitter in the remote control to the radio frequency receiver, thereby manipulating the fan 110 between the on and off settings. In certain embodiments, a remote control can also be used to control fan rotation and/or modulation as discussed above. In certain embodiments, a single remote control can actuate fans in more than one decoy. In other embodiments, the remote control can actuate one fan in a single decoy. In certain embodiments, a single remote control can be used to transmit control signals at different frequencies. This can allow a first set of decoys with receivers set at a first frequency to receive control signals sent at the first frequency, while a second set of decoys with receivers set at a second frequency can receive control signals sent at the second frequency. In certain embodiments, this can allow a user to separately control different groups in a set of decoys using a single remote control.

In the embodiment shown in FIG. 1, for example, the decoy 100 includes a solar panel 116 configured to supply power for the fan 110. In the embodiment shown, the solar panel is disposed on the head and neck portion 112 at the top of the head. In other embodiments, a solar panel can be disposed on the head and neck portion 112 at the back of the neck or under the bill/chin. In embodiments that do not include a head and neck portion 112, the solar panel 116 can be disposed elsewhere on the decoy. The solar panel 116 is in electrical communication with the fan 110 via wires 118. In certain embodiments, for example, the decoy 100 includes a battery configured to supply power for the fan 110. In such embodiments, the battery may be in electrical communication with the solar panel 116 and may be rechargeable using the solar panel 116. In certain embodiments, for example, a decoy can include a battery configured to supply power for the fan 110 and not a solar panel.

Certain embodiments of the present technology provide methods of making a decoy. Such methods can include making decoys such as those described above in connection with FIGS. 1-3. In certain embodiments, for example, a method of making a decoy can include: attaching a non-rigid body and a fan to a rigid member, wherein the non-rigid body includes an inner portion and an exterior portion, and wherein the fan is configured to direct air toward the inner portion of the non-rigid body. In certain embodiments, for example, the non-rigid body and the fan can be removably attached to the rigid member. In certain embodiments, for example, a method of making a decoy can include: attaching a head and neck portion to the rigid member. In certain embodiments, for example, the head and neck portion can be removably attached to the rigid member. In certain embodiments, for example, a method of making a decoy can include providing a solar panel in electrical communication with the fan to provide power for the fan. In certain embodiments, for example, the solar panel can be attached to the head and neck portion. In certain embodiments, for example, a method of making a decoy can include providing a battery in electrical communication with the fan to provide power for the fan.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A stationary waterfowl decoy comprising:
    a unitary one-piece vertical elongated rigid member comprising a first end, a second end and a vertical longitudinal axis, the second end securing into the ground so that the decoy is in a stationary position;
    a non-rigid body comprising an inner portion and an exterior portion, the non-rigid body directly attached to the rigid member; and
    an electric fan assembly directly attached to the rigid member with the rigid member extending above the fan assembly, the fan assembly directing air toward the inner portion of the non-rigid body, thereby causing movement of the non-rigid body while the decoy remains in the stationary position, wherein the entire fan assembly rotates about the longitudinal axis of the rigid member while directing air toward the inner portion of the non-rigid body.

2. The decoy of claim 1, wherein the inner portion comprises an inflatable bladder.

3. The decoy of claim 1, wherein the non-rigid body and the fan are removably attached to the rigid member.

4. The decoy of claim 1, further comprising a solar panel configured to supply power for the fan.

5. The decoy of claim 1, further comprising a battery configured to supply power for the fan.

6. The decoy of claim 1, further comprising a head and neck portion directly attached to the rigid member by securing the head and neck portion to the first end of the rigid member.

7. The decoy of claim 6, wherein the head and neck portion is removably attached to the rigid member.

8. The decoy of claim 6, further comprising a solar panel disposed on the head and neck portion, the solar panel supplying power for the fan.

9. The decoy of claim 1, wherein the fan is configured to be manipulated between an on setting, wherein the fan is turned on, and an off setting, wherein the fan is turned off, using a switch that can be manipulated manually.

10. The decoy of claim 1, wherein the fan is configured to be manipulated between an on setting, wherein the fan is turned on, and an off setting, wherein the fan is turned off, using a radio frequency transmitter and receiver.

11. The decoy of claim 10, wherein the radio frequency transmitter transmits at a plurality of different radio frequencies, and the receiver receives control signals at one of the plurality of different radio frequencies.

12. The decoy of claim 1, wherein the fan is configured to be manipulated between an on setting, wherein the fan is turned on, an off setting, wherein the fan is turned off, and a modulate setting, wherein the fan modulates between on and off settings at a specified interval of time, using a switch that can be manipulated manually.

13. The decoy of claim 1, wherein the fan is configured to be manipulated between an on setting, wherein the fan is turned on, an off setting, wherein the fan is turned off, and a modulate setting, wherein the fan modulates between on and off settings at a specified interval of time, using a radio frequency transmitter and receiver.

14. The decoy of claim 1, wherein the fan assembly rotates its position using a constant motion such that the fan position constantly changes.

15. The decoy of claim 1, wherein the fan assembly rotates its position using a delayed motion such that the fan position remains constant for a time at a certain position.

16. The decoy of claim 1, wherein the rigid member extends beyond the non-rigid body.

17. The decoy of claim 1, wherein the rigid member comprises a stake and the second end comprises a pointed end configured to secure the rigid member to the ground.

18. A stationary waterfowl decoy comprising:
a unitary one-piece vertical elongated rigid member comprising a first end, a second end and a vertical longitudinal axis, the second end securing into the ground so that the decoy is in a stationary position;
a non-rigid body comprising an inner portion and an exterior portion, the non-rigid body directly attached to the rigid member; and
an electric fan assembly directly attached to the rigid member with the rigid member extending above the fan assembly, the fan assembly directing air toward the inner portion of the non-rigid body, thereby causing movement of the non-rigid body while the decoy remains in the stationary position, wherein the entire fan assembly moves laterally from side-to-side with respect to the longitudinal axis of the rigid member while directing air toward the inner portion of the non-rigid body.

19. The decoy of claim 18, wherein the fan assembly moves its position from side to side using a constant motion such that the fan position constantly changes.

20. The decoy of claim 18, wherein the fan assembly moves its position from side to side using a delayed motion such that the fan position remains constant for a time at a certain position.

* * * * *